US011596903B2

(12) United States Patent
Syron et al.

(10) Patent No.: US 11,596,903 B2
(45) Date of Patent: Mar. 7, 2023

(54) SELF-COILING HOLLOW FIBRE MEMBRANE

(71) Applicant: OXYMEM LIMITED, Westmeath (IE)

(72) Inventors: Eoin Syron, Wicklow (IE); Michael Semmens, Padua (IT); Malcolm Whelan, Roscommon (IE); John Geaney, Galway (IE); Nigel Coombes, West Sussex (GB); Wayne Byrne, Kildare (IE); Barry Heffernan, Galway (IE)

(73) Assignee: OXYMEM LIMITED, Westmeath (IE)

( * ) Notice: Subject to any disclaimer, the term of this patent is extended or adjusted under 35 U.S.C. 154(b) by 993 days.

(21) Appl. No.: 16/338,108

(22) PCT Filed: Sep. 30, 2017

(86) PCT No.: PCT/EP2017/074922
§ 371 (c)(1),
(2) Date: Mar. 29, 2019

(87) PCT Pub. No.: WO2018/060510
PCT Pub. Date: Apr. 5, 2018

(65) Prior Publication Data
US 2019/0217253 A1    Jul. 18, 2019

(30) Foreign Application Priority Data
Oct. 1, 2016 (EP) .................................. 16191999

(51) Int. Cl.
*B01D 63/02* (2006.01)
*B01D 67/00* (2006.01)
(Continued)

(52) U.S. Cl.
CPC ......... *B01D 69/084* (2013.01); *B01D 63/021* (2013.01); *B01D 65/08* (2013.01);
(Continued)

(58) Field of Classification Search
CPC .... B01D 69/084; B01D 63/021; B01D 65/08; B01D 67/0009; B01D 67/0013;
(Continued)

(56) References Cited

U.S. PATENT DOCUMENTS

| 5,470,659 A | 11/1995 | Baumgart et al. |
| 6,395,226 B1 * | 5/2002 | Plunkett ................. B01D 71/76 96/10 |
| 2001/0027951 A1 * | 10/2001 | Gungerich .............. C02F 1/444 210/636 |

OTHER PUBLICATIONS

International Search Report and Written Opinion in corresponding International Patent Application No. PCT/EP2017/074922 dated Apr. 17, 2018. 16 pages.
(Continued)

*Primary Examiner* — Magali P Slawski
*Assistant Examiner* — Angel Olivera
(74) *Attorney, Agent, or Firm* — Leason Ellis LLP

(57) ABSTRACT

A hollow fibre membrane having a coiled, a hemihelix, a helical or an undulated native form, in which the membrane can be stretched by up to 4-times its original length with no plastic deformation, and wherein the native form of the membrane is produced by the asymmetric flow of liquid polymer through an opening of a die or nozzle.

13 Claims, 9 Drawing Sheets

(51) Int. Cl.
    *B01D 69/08*   (2006.01)
    *B01D 71/06*   (2006.01)
    *B01D 71/70*   (2006.01)
    *D01D 5/24*    (2006.01)
    *D01D 5/247*   (2006.01)
    *D01F 1/08*    (2006.01)
    *B01D 65/08*   (2006.01)

(52) U.S. Cl.
    CPC ..... *B01D 67/0009* (2013.01); *B01D 67/0013* (2013.01); *B01D 67/0018* (2013.01); *B01D 69/082* (2013.01); *B01D 69/085* (2013.01); *B01D 69/087* (2013.01); *B01D 71/06* (2013.01); *B01D 63/02* (2013.01); *B01D 71/70* (2013.01); *B01D 2313/025* (2013.01); *B01D 2313/21* (2013.01); *B01D 2315/05* (2013.01); *B01D 2315/06* (2013.01); *B01D 2323/42* (2013.01); *B01D 2325/027* (2013.01); *B01D 2325/06* (2013.01); *D01D 5/24* (2013.01); *D01D 5/247* (2013.01); *D01F 1/08* (2013.01); *Y02W 10/10* (2015.05)

(58) Field of Classification Search
    CPC ............. B01D 67/0018; B01D 69/082; B01D 69/085; B01D 69/087; B01D 71/06; B01D 63/02; B01D 2313/025; B01D 2323/42; B01D 2325/027; B01D 2325/06; B01D 71/70; B01D 2313/21; B01D 2315/05; B01D 2315/06
    See application file for complete search history.

(56) References Cited

OTHER PUBLICATIONS

Luelf et al. "Rope coiling spinning of curled and meandering hollow-fiber membranes." Journal of membrane science 506 (2016): 86-94.

Tian et al. "Silicone foam additive manufacturing by liquid rope coiling." Procedia CIRP 65 (2017): 196-201.

* cited by examiner

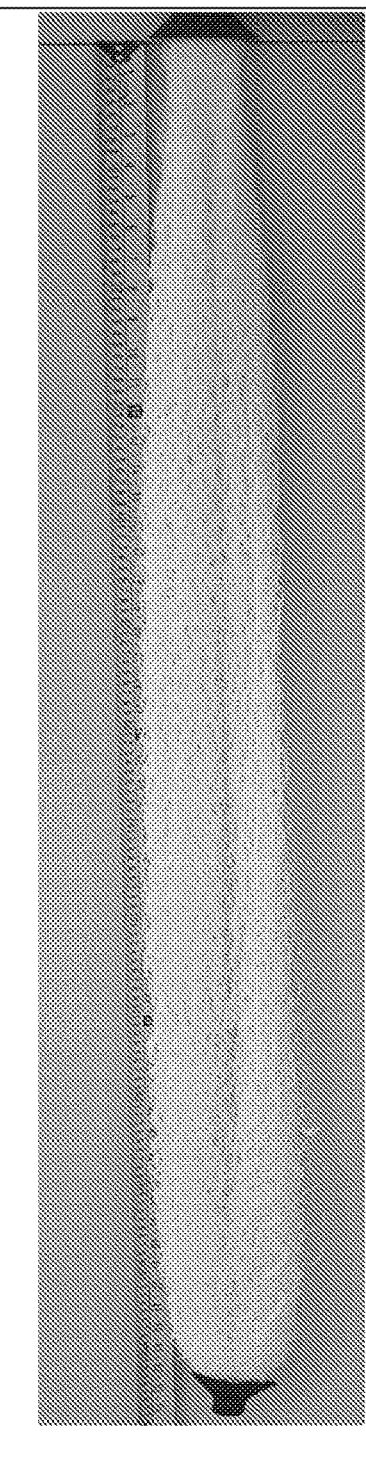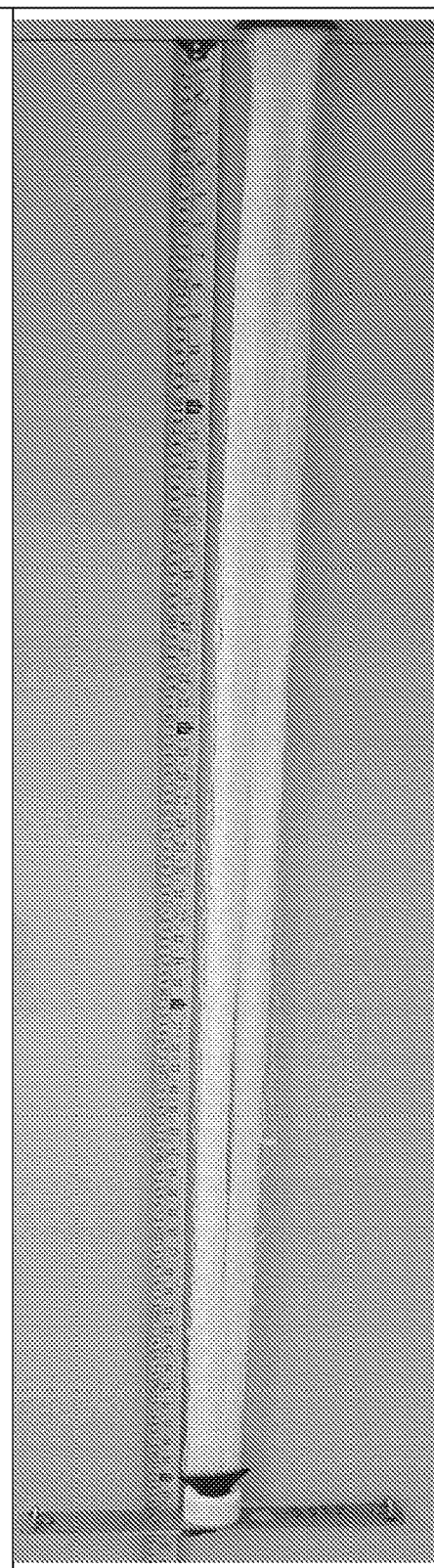
Figure 6A                    Figure 6B

SELF-COILING HOLLOW FIBRE MEMBRANE

CROSS-REFERENCE TO RELATED PATENT APPLICATIONS

This application is a U.S. National Stage Application under 35 U.S.C. § 371 of International Patent Application No. PCT/EP2017/074922, filed 30 Sep. 2017, which claims the benefit of priority under 35 U.S.C. Section 119(e) of European Patent Application number EP 16191999.8, filed 1 Oct. 2016, both of which are incorporated by reference in their entireties. The International Application was published on 5 Apr. 2018, as International Publication No. WO 2018/060510 A2.

FIELD OF THE INVENTION

This invention relates to membranes that are used either for gas transfer, to and from a liquid, to and/or from a chemically or biologically active layer on the surface of the membrane, or for filtration of solids from liquid in the water or process industry. In particular, the invention relates to hollow fibre membranes which are self-coiling; and in which the coil diameter reduces and coil pitch increases when under tension; and when tension is released (removed), the membrane returns to its natural self-coiled state, without damage to the membranes.

BACKGROUND TO THE INVENTION

Membranes are increasingly being used as separation devices in a multitude of different processes from the healthcare and pharmaceutical industry to the water and wastewater industry. Due to the compactness of membrane modules, their high specific surface area per unit volume and their ever-reducing cost, membrane-based separation processes are becoming more and more common in industry and the world in general. Membranes are generally produced as hollow fibres or flat sheets. These basic units can be arranged around or connected to supports to achieve different configurations, for example, flat sheets can be configured to create spiral wound modules and hollow fibres can be woven or knitted together to form a fabric. These membranes and their module configurations are typically held in place by rigid structural supports and frames and may be confined within a housing or shell. Different designs may allow for limited movement of the membranes or they may be constrained and held in a fixed position by the frame, which itself is aligned with and connected to other frames. For hollow fibre membranes, they are connected to at least one manifold/header through which the fluid, that passes across the membrane wall, is either supplied or withdrawn from the membrane lumen. In many cases the hollow fibre membranes are connected to two headers, one at either end of the hollow fibre.

When liquids flow over the outer or inner surface of a membrane, a liquid boundary layer develops due to the non-slip condition at the membrane surface. The thickness of the boundary layer is a function of the local Reynolds number (affected by the kinematic viscosity of the liquid and the liquid velocity past the membrane) and the distance the fluid flows over the membrane surface as illustrated in FIG. 1. Typically, the boundary layer grows in thickness from the leading edge of the membrane surface until it attains a maximum steady state thickness. As a result, diffusion controls mass transport across this boundary layer and concentration gradients form across the boundary layer. In gas transfer applications, this thick boundary layer acts like a "liquid film" surrounding the membrane and it often limits the rate of gas transfer across the membrane and mass transfer is said to be "liquid film diffusion controlled". In filtration applications contaminants rejected by the membrane, both particulate and molecular, accumulate in the boundary layer and can only escape back to the bulk solution via diffusion. Thus, filtration is also film diffusion controlled, and the accumulation of contaminants close to the membrane, is commonly referred to as "concentration polarization". In summary, the liquid boundary layer that develops at the membrane surface severely impacts the performance of membrane process applications. In filtration applications backwashing of the permeate through the membrane is common to break disperse the accumulated particles or molecules in the boundary.

Many studies have been conducted to find ways to minimize the impact of liquid film diffusion control so the full mass transfer potential of the membrane can be realized. Unfortunately, any attempt to reduce the thickness of the boundary layer carries an energy penalty. High water velocities increase shear and reduce boundary layer thickness but they incur higher pressure drops and require more pumping energy. Aeration, which uses bubbles to disrupt boundary layers and increase shear, requires gas compression. Encouraging the water to flow normal to the axes of hollow fibre membranes (cross-flow), instead of parallel to the length of the fibres (parallel flow) can reduce the boundary layer thickness dramatically, since the boundary layer has little distance to develop in cross-flow, however cross-flow comes with drag and higher pressure drops. In addition, cross-flow is not feasible with slack, submerged hollow fibre membrane modules since the fibres are pushed into each other and the effective surface area of the fibres is reduced. Many other approaches including pulsatile flow, Dean vortices, ultrasound, vibration systems etc. all suffer from the same penalty of higher energy costs and none of these methods can be really effectively applied to submerged membrane modules.

Some work has been carried out to investigate a deviation from the general parallel hollow fibre configuration (Yang et al., 2011 and 2014), In that study, porous, cylindrical yet curly and spacer-knitted membrane fibres made from Polyvinylidene difluoride (PVDF) were used in modules for membrane distillation. While the flux enhancement was increased, the curly shape of the membrane was achieved by an additional process in this case the heat treatment of the wound membrane around a stainless-steel rod which was carried out post fabrication. The shape of the curly membranes was unadaptable as the winding angle was fixed at 60° and could not be changed or altered when in operation.

It is an object of the present invention to overcome at least one of the above-mentioned problems.

SUMMARY OF THE INVENTION

The object of the present invention is to prevent or keep to a minimum the development of thick boundary layers over the outer surfaces of hollow fibre membranes, while minimizing the associated energy penalty. Curly or coiled membranes have been shown to have improved mass transfer characteristics when compared to straight hollow fibre membranes. To date all membranes with this curly or undulating nature have been manufactured by first manufacturing a hollow-fibre membrane and then using a winding, or other similar mechanism such as a crimping machine, to kink or create the curliness in the membrane. This results in additional cost and complexity in the manufacturing process. The coil diameter and pitch between coils is then regular and the same for all membranes manufactured with this process. This results in the membranes nesting into each-other and preventing liquid contact with the outside of each of membrane. The current invention provides membranes with a coil or hemihelix shape, with an irregular pitch and coil diameter. The three-dimensional structure created by these membranes when potted into bundles tends to reduce the effective boundary layer thickness that can develop as water flows around and over the fibres in a bundle. The membrane module design described herein using the membranes of the claimed invention provides intricate dynamic fluid flow paths for the water flowing around and through large bundles of the hollow fibre membranes so as to optimize the fluid contact with the membranes and to ensure all the membranes within the membrane housing are used effectively. This design offers superior mass transfer performance while minimizing the required energy input.

According to the present invention, there is provided, as set out in the appended claims, a hollow fibre membrane which can be used for gas separation, gas removal from a liquid, gas delivery to a liquid or gas delivery to a chemically or biochemically reactive layer on the outer surface of the membrane such as a biofilm or the filtration of solids from a liquid. Where this membrane or an array of said membranes is connected to a manifold at both longitudinal ends, liquid can be removed from the lumen of the membrane, gas can be removed from the lumen of the membrane or gas can be supplied to the lumen of the membrane.

Preferably, there is provided a hollow fibre membrane having a coiled, a hemihelix, a helical or an undulated native form, in which the membrane can be stretched by up to 4-times its original length with no plastic deformation, and wherein the native form of the membrane is produced by the asymmetric flow of liquid polymer through an opening of a die or nozzle.

Each of the hollow fibre membranes is shaped like a hemihelix, a helix or spring or coil with the hollow lumen being continuous along the entire length of the membrane. The internal diameter can range between 50 µm and 100 mm in size. Preferably, the internal diameter can range between 50 µm and 10 mm in size. Ideally, the internal diameter can range between 50 µm and 2 mm in size. Because the hollow fibre is helical/coiled in shape, there is always a part of the membrane fibre that is perpendicular to the bulk liquid flow, no matter the direction of the bulk liquid flow. This means that a large boundary layer is not allowed to develop along the length of the hollow fibre.

In applications where membrane fouling occurs, or the growth of a biological layer is encouraged over the surface of the membrane such as a Membrane Biofilm Reactor, the ability to change, temporarily, the coil diameter and the coil pitch of the membrane fibre by increasing the distance between the upper and lower headers by between about 1% to about 200% of the original length of the fibres, with the membrane fibres returning to their original coil diameter and pitch once the distance between both headers has returned to their original distance from each other. The change in pitch and diameter of the membrane fibres subsequently changes (i) the membrane packing density or (ii) the specific surface area ($m^2$ of the membrane surface area per $m^3$) of the module by increasing the volume occupied by the membrane module. These volume changes that occur within the module may be utilized to enhance membrane cleaning, foulant removal or biofilm control. For example, under tension, or when the distance between the upper and lower headers is extended, the coil diameter will be reduced and the coil pitch will be increased, meaning that the membranes will become straighter and be drawn closer together. This will also result in an increase in spacing between each of the membrane bunches allowing for the easy removal and washout of the detached foulants or biomass particles. In addition, the fibre-fibre contact created by changing the shape of the helix/coiled membrane may itself act to shear and dislodge foulants and biofilm from the fibre surfaces.

According to the present invention, there is provided, as set out in the appended claims, a hollow fibre membrane, which favours a coiled, curly or an irregular helical form when in a relaxed state. The coiled/curly/irregular helical form of the fibre membrane is a natural property of the membrane after manufacture. The coiled, curly or an irregular helical form of the fibre membrane is created by the asymmetrical flow of the fluid polymer exiting the die/nozzle, without the need for any post-process treatment. The manufacture of the membrane can be by any method known to the skilled person, such as extrusion, spinning, Thermally Induced Phase Separation (TIPS) or Solvent Induced Phase Separation (SIPS) processes. The polymeric material can be solidified by known methods, such as cooling, solvent extraction or thermosetting. With each of these methods, solidifying the polymer membrane creates the membrane hollow fibre with elements such as wall pores, along with other membrane properties such as tortuosity. Once the coiled/curly/irregular helical form hollow fibre membrane has been produced, it is generally wound onto a spool and stored until it is manufactured into a module.

Traditionally, if the membrane is to have a non-linear shape, this modification has previously been created by one of the following methods:

Heating and gently wrapping the membrane around a cylinder where the heat makes the membrane suppler and allows it to take on the new form without damage being caused to the membrane. Both the membrane and the cylinder are allowed to cool. And once cooled the membrane takes on the coiled undulating form. This method results in a membrane with a regular helix having a uniform coil diameter and pitch (Yang et al. 2011)

After the membrane has exited a water bath, it is pushed between devices which create the undulations. (U.S. Pat. No. 5,470,659)

Rope coiling. (Luelf et al. 2016)

In the present invention, the coiled nature of the membrane is created in the membrane manufacturing process. By creating an asymmetrical flow of the fluid membrane (polymer solution) at the tip where the solution exits the die or nozzle, the membrane, when solidified, adopts a non-linear/curly/coiled/hemihelix shape. The asymmetrical flow is created by a combination of the shape and size of the die and needle causing an asymmetrical flow in the fluid polymer as its exits the die or the nozzle, causing the membranes, when solidified, to adopt a non-linear/curly/c oiled/hemihelix shape.

In one embodiment, the non-linear form is a coiled form, a helical form, an irregular coil form, a hemihelix form, or an undulated form.

In one embodiment, the opening of the die or nozzle has a diameter at least 1.01- to 4-times that of the outer diameter of the hollow fibre membrane. Preferably, the opening of the die or nozzle has a diameter at least 1.01- to 3-times that of the outer diameter of the hollow fibre membrane. Ideally, the opening of the die or nozzle has a diameter at least 1.01- to 2-times that of the outer diameter of the hollow fibre membrane.

In one embodiment, when placed under tension by extending the distance between the upper and lower headers between by about 1% and about 200% of the original natural (relaxed) state of the membrane, the non-linear form of the hollow fibre membrane has its coil and pitch altered so that the hollow fibre membrane goes from a non-linear form to a substantially linear form. The irregular coils reduce in diameter and the pitch between subsequent coils increase in length. When the tension is removed from the membrane and the distance between the upper and lower headers returned to its original value, the membrane returns to its original curled form, without any deformation.

In one embodiment, when placed under tension, the hollow fibre membrane has its pitch altered so that the hollow fibre membrane goes from a non-linear form to a substantially linear form.

In one embodiment, each hollow fibre membrane defines a lumen configured to contain a gas phase or a liquid phase, which is separated from the gas or liquid phase outside the membrane by the membrane wall.

In one embodiment, the hollow fibre membrane is gas permeable.

In one embodiment, the hollow fibre membrane comprises pores of less than 5 µm.

In one embodiment, the hollow fibre membrane comprises pores of less than 5 nm.

In one embodiment, the hollow fibre membrane is a dense membrane and substantially free of pores, but still permeable to gases and vapours.

In one embodiment, an internal diameter of the hollow fibre membrane is between 50 µmm and 10 mm. Preferably, the internal diameter of the hollow fibre membrane is between 50 µmm and 2 mm.

In one embodiment, the hollow fibre membrane has a cylindrical inner and outer cross section. In one embodiment, the hollow fibre membrane has a cylindrical inner and non-cylindrical outer cross section. In one embodiment, the hollow fibre membrane has a non-cylindrical inner and outer cross section.

In one embodiment, the hollow fibre membrane has an outer surface that is uneven or irregular, including projections or ridges extending outward from the outer surface of the membrane or with indentations extending inwards.

In one embodiment, the membrane is made from a material (liquid polymer) selected from Poly-dimethyl-siloxane (PDMS), silicone, polymethylpentene (PMP), Polyvinylidene fluoride (PVDF), Polyethersulfone (PES), Polypropylene (PP), Polyethylene, Polysiloxanes or other polymeric plastic, elastic or rubber. Preferably, the hollow fibre membrane is made from PDMS or silicone. The material of manufacture is such that it is sufficiently elastic so that when the distance between the upper and lower header is increased by between about 1% and 200% of its resting length, no permanent damage is done to the membrane and the membrane returns to its original form and length. The hollow fibre membrane is capable of being stretched by up to 4-times its length without any plastic deformation of the fibre membrane.

In one embodiment, the hollow fibre membrane is configured to remove dissolved gas from a liquid or to dissolve gas into a liquid.

In one embodiment, the hollow fibre membrane is configured to separate a liquid from a mixture of that liquid containing suspended solid particles.

In one embodiment, when in use, at least a part of the hollow fibre membrane is always perpendicular to a bulk fluid flow.

In one embodiment, the membrane supports a biofilm. Preferably, the biofilm is supplied with a gas from the lumen of the membrane.

According to the present invention, there is provided a hollow fibre silicone membrane having a coiled, a hemihelix, a helical or an undulated native form; in which the membrane can be stretched by up to 4-times its original length with no plastic deformation, has an outer surface that is uneven or irregular comprising projections or ridges extending outward from the outer surface of the membrane, and wherein the native form of the membrane is produced by the asymmetric flow of liquid polymer through an opening of a die or nozzle. Ideally, the opening of the die or nozzle has a diameter at least 1.01- to 2-times that of the outer diameter of the hollow membrane fibre.

According to the present invention, there is also provided, as set out in the appended claims, an array of vertically aligned, hollow fibre membranes comprising hollow fibre membranes that favour a coiled, curly, helical, hemihelix or spring-like form when in its native state, wherein the membranes are attached at either end to a manifold, and wherein the lumen of the membrane is in communication with an inner space of the manifold and the manifold can be used to supply or remove liquid or gas to or from the lumen of the membrane.

In one embodiment, each of the membranes in the array have either a helical form, a coiled form, a hemihelix form, a form which significantly deviates from linear such that the coil width of the relaxed membranes is between 2.5-50 times the outer diameter of the membrane.

In one embodiment, the membranes have a helical form with a regular coil diameter length and a regular coil pitch length.

In one embodiment, the membrane has a coiled form, where the membrane fibres have an irregular or varying coil diameter and an irregular or varying pitch length.

In one embodiment, each membrane has a coiled form and the membranes in the array have different pitches, coil-diameter and coil direction with the coil direction varying between clockwise and counter clockwise along the length of the hollow fibre membrane.

In one embodiment, the direction of the curly form, hemihelical form, helical form, coiled form or undulated form of each membrane fibre is in a clockwise direction or an anticlockwise direction, or a combination thereof.

In one embodiment, the change in length of the hollow fibre membranes, and the tension applied thereto, is controlled by at least one manifold adapted to move in a reversible vertical direction relative to the opposite end of the array.

In one embodiment, when the at least one manifold moves in a reversible vertical direction relative to the opposite end of the array, tension in the linear direction of the hollow fibre membranes is produced, causing a change in length of the hollow fibre membranes. The change in length results in the membranes changing from their relaxed, coiled (non-linear) form to a linear form. Alternatively, when the at least one manifold moves in a vertical direction towards the opposite end of the array, the tension on the hollow fibre membranes is decreased (relaxed) causing the hollow fibre membranes to return to their natural coiled state.

In one embodiment, a change in the form of the hollow fibre membranes due to an increase in the distance between the upper and lower headers alters the 3D structure of the array, and changes the liquid flow pattern around and over the membrane surface area.

In one embodiment, there is provided an array of hollow fibre membranes described above for use in water treatment or wastewater treatment systems, such as but not limited to, Membrane Bio-Reactors, submerged membrane filtration, Membrane Biofilm Reactors, Membrane Distillation, Nano-Filtration, Reverse Osmosis, and Forward Osmosis.

In one embodiment, the hollow fibre membrane may be used for the filtration of solid particles or large molecules from a liquid.

In one embodiment, the hollow fibre membrane may be used for the delivery of gas into a liquid.

In one embodiment, the hollow fibre membrane may be used for the removal of dissolved gas from a liquid.

In one embodiment, the hollow fibre membrane may be used to supply a reactive species (e.g. gas) directly to an attached chemical or biochemical layer attached to the outer surface of the membrane (for example, in a Membrane Biofilm Reactor).

In one embodiment, all of the hollow fibres in an array follow the same direction of turning (all have a clockwise or an anticlockwise coil).

In one embodiment, a percentage of the hollow fibres in an array coil in a clockwise direction while the remaining membranes coil in an anticlockwise direction.

In one embodiment, the hollow fibres in an array may have coils in both a clockwise and anticlockwise direction.

In one embodiment, there is provided a method of manufacturing the coiled, hemihelical, helical or undulating hollow fibre membranes described above, the method comprising the steps of passing a liquid polymer through a die opening and around a needle which are asymmetrically aligned, wherein the opening produces an asymmetric flow of liquid polymer as its exits the die or the nozzle to produce a coiled, hemihelical, helical or undulated membrane.

Preferably, the hollow fibre membrane is made by a process of extrusion, spinning, casting, Thermally Induced Phase Separation (TIPS) or Solvent Induced Phase Separation (SIPS).

Ideally, when the process is extrusion, an additional stress is imparted by extruding the hollow fibre membrane onto a conveyor running at a higher speed than the fluid polymeric membrane exiting the die or the nozzle. The speed of the conveyor after the curing oven is 5 to 600 metres per second.

Ideally, when the process is spinning, TIPs or SIPs, the angle of the die nozzle is tilted at least about 2° to 30° from the vertical axis Y. Preferably, the tilt is 5°, 6°, 7°, 8°, 9°, 10°, 11°, 12°, 13°, 14° or 15° from the vertical axis Y of the hollow fibre membrane. The tilt of the nozzle/die creates an asymmetrical flow during the TIPS, SIPS or spinning process.

As can be observed in the accompanying figures, the packing density of the membranes is variable along the length due the difference in tension between the different regions along the length of the membrane. This coil diameter as well as the pitch between coils varies along the length of the hollow fibre, is variable with tension on the fibre and can be influenced by direction and velocity of fluid flow, around the outside of the membranes. Additionally, the pitch or winding angle (as described by Yang et al, 2011) is not fixed but can be adjusted in situ by adjusting the tension on the length of the membranes.

Cross-flow is not feasible with slack, linear, submerged, hollow fibre membrane modules since the fibres are pushed into each other and the effective surface area of the fibres is reduced. The present invention describes a membrane, which when incorporated into a submerged membrane module design, can maintain a high effective surface area, and provide improved mass transfer with low energy input with either cross flow or parallel flow.

Definitions

In the specification, the term "tension-sensitive" or "tension" should be understood to mean that when a tension force is applied to the end or ends of the hollow fibre, for example, by means of increasing the distance between the upper and lower header, the coil diameter and pitch between coils (as defined in FIG. 2) of the membrane changes form. The change in tension along a hollow fibre membrane due to its own weight can be observed in FIG. 5B, with the coil diameter and pitch length varying along the length of the membrane due to changes in tension along the length of the membrane. When enough tension is used to overcome the self-coiling force of the natural state of the fibres, then the hollow fibre becomes straight and its length can be extended up to about 200% (twice) to 1,000% (ten-times) of its original relaxed (predisposed) length. When the tension is reduced or removed, the membrane recovers to its original coiled, helical or curly form again, with no plastic deformation.

In the specification, the terms "helical", "coiled", "curly", "spring-like", "hemihelix" and "irregular coil" when used in relation to the hollow fibre membrane described herein should be understood to mean the shape that the hollow fibre membrane is found following manufacture in its relaxed (predisposed) state. The self-coiled native shape is formed due to the stresses exerted on the flow of fluid polymer exiting the die/nozzle in the manufacturing process before becoming set into a solid and without any subsequent dedicated shape-forming steps. The term "hemihelix" should be understood to mean a quasi-helical curved geometric shape characterized by a helical structure that is divided into two (or more) sections of opposite chirality, with a transition between the two in the middle.

In the specification, the term "natural property" or "natural self-coiled state" should be understood to mean that the hollow fibre membranes described herein do not undergo any post-manufacturing modifications, such as modifications described in Yang et al, 2011. U.S. Pat. No. 3,616,928 (mechanical crimping) or U.S. Pat. No. 5,470,659 (mechanical crimping), U.S. Pat. No. 5,626,758, Moulin et al, 1995, in order to achieve a non-linear shape. The fibre membranes are neither knitted nor crimped to achieve their curly or spring-like or coiled or helical shapes In the specification, the term "fluid" should be understood to mean any material which deforms and is free to flow on its own or under shear force, and include both gases and liquids. "Liquid" should be understood to mean a nearly incompressible fluid that conforms to the shape of its container but retains a substantially constant volume independent of pressure. Typically, a fluid or liquid has an apparent viscosity of less than $1 \times 10^9$ centipoise ($1 \times 10^6$ Pa s).

In the specification, the hollow fibre membrane is composed of silicone rubber, Poly-dimethyl-siloxane (PDMS), silicone, polymethylpentene (PMP), Polyvinylidene fluoride (PVDF), Polyethersulfone (PES), Polypropylene (PP), Polyethylene, Polysiloxanes or other polymeric plastic or elastic.

In the specification, the term "Membrane Biofilm Reactor" (MBfR) should be understood to mean a reactor in which it is the intention to grow an active biofilm layer on the surface of the membrane and pass a substrate through the membrane wall to the biofilm and where the biofilm receives another substrate from the free surface in contact with the surrounding fluid, resulting in a counter-diffusional biofilm. An example of the MBfR is the Membrane Aerated Biofilm Reactor MABR. In the MABR, a biofilm is naturally immobilized on an oxygen permeable membrane. Oxygen diffuses through the membrane into the biofilm where oxidation of pollutants, supplied at the biofilm-liquid interface, takes place. The oxygen supply rate is controlled by the intramembrane oxygen partial pressure (a process parameter) and membrane surface area (a design parameter). It is also an object of the present invention to maximise the rate of mass transfer of the pollutants from the wastewater into the pollutant degrading biofilm by preventing the formation of laminar boundary layers over the surface of the biofilm in the polluted wastewater. The MBfR consists of millions of hollow fibre membranes all connected to a gas supply. In the case of the MABR these membranes are surround by the wastewater which is being treated by biofilm on the surface.

In the specification, the term "asymmetric flow" should be understood to mean that the cross-sectional flow of the polymer from the die is not symmetrical about all diameters.

Method of Manufacture

Extrusion of silicone rubber is very common and has been conducted for many years. Information on the extrusion of silicone can be found at www.wacker.com (Solid and liquid silicone rubber, material and processing guidelines, https://www.wacker.com/cms/media/publications/downloads/6709_EN.pdf). A typical method of producing the hollow fibres, composed of silicone or PDMS, as described herein is as follows:

1. Liquid silicone or silicone fluid with a catalyst premixed is fed into an extruder, this catalyst can be either peroxide or platinum based.
2. The extruder barrel is kept cold to ensure that the silicone rubber does not begin to crosslink (vulcanize) before reaching the extruder die.
3. The fluid silicone rubber passes around a central needle through the die annulus/opening to form a hollow fibre. The centre of the needle must be connected to an air source or to atmosphere allow air to be drawn into the lumen of the extruded hollow fibre, otherwise there is a risk that the newly formed tube will collapse due to a vacuum being created in the centre of the hollow fibre.
4. The die can have an asymmetrical opening of between 1.01- and 2-times the outer diameter of the final hollow fibre membrane. The fluid annulus which leaves the die has a larger diameter with a thicker wall than the desired final hollow fibre membrane. These lend to the creation of an uneven flow of the liquid polymer through the die.
5. The silicone hollow fibre passes through a curing oven where it is heated up to a temperature between 150° C. and 300° C. The increase in temperature speeds up the crosslinking reaction between the PDMS molecules, and cures or vulcanises the silicone rubber to become a solid.
6. The hollow fibre then passes onto a conveyer. The conveyer is running at a faster speed than the material leaves the die of the extruder and therefore draws down the size of the extruded hollow fibre. The conveyer is typically running at between 5 and 600 meters per second.
7. When the hollow fibre exits the curing oven it is a solid elastic rubber that is held under tension by the conveyer, which is running at a high speed.
8. After the conveyer, the material can be further arranged to make it suitable for arrangement into an array and manufacture into modules. It is typically wound onto a spool or into a hank and stored for further assembly.

This method of manufacture can be used for both straight and curly hollow fibre membranes. The difference in the two types of fibre membranes occurs due to the uneven stresses that occurs around the perimeter of the solidified membrane due to the asymmetric flow of polymer fluid material as it exits the needle die which creates the curly fibre membranes, without any mechanical post-processing or additional manufacturing step.

Other types of membrane manufacture, such as TIPS and SIPS which create a solid membrane when the polymer phases are separated from the solvent, can also create a similar curly membrane by creating asymmetric flow of the polymer solution leaving the nozzle or die, without any mechanical post-processing or additional manufacturing step.

The TIPS process involves heating of the polymer and spinning the hollow fibre through a die nozzle into a bath of cool liquid (usually water) to cool. The polymer sets and hardens when cooled. The die nozzle has an opening of between 1.01- and 2-times the outer diameter of the final hollow fibre membrane. The fluid annulus which leaves the die has a larger diameter with a thicker wall than that of the desired final hollow fibre membrane. As the fluid is spun through the die having this arrangement the fluid flows asymmetrically, and the resulting membrane is predisposed to adopt a coiled configuration when it cools.

The SIPS process involves dissolving the polymer in a solvent and which is then cast from a die nozzle into a bath of water. The die nozzle has an opening of between 1.01- and 2-times the outer diameter of the final hollow fibre membrane. In this instance, the asymmetric fluid annulus which leaves the die has a larger diameter with a thicker wall than that of the desired final hollow fibre membrane. The solvent is removed from the solvent/polymer solution in the water as the solvent is miscible in water but the polymer is immiscible, the polymer then crystalizes, and the resulting hollow fibre membrane adopts a coiled/helical configuration without applying any tension. In other words, the membrane is predisposed to adopt a coiled/helical configuration.

BRIEF DESCRIPTION OF THE DRAWINGS

The invention will be more clearly understood from the following description of an embodiment thereof, given by way of example only, with reference to the accompanying drawings, in which: —

FIG. 6 is a photograph of an array of self-coiling membrane (A) under no additional tension and (B) under tension with weight attached to the end.

DETAILED DESCRIPTION

The membranes of the subject invention can take on an irregular helical, a helical or coiled or curled shape that varies in pitch length and coil diameter when tension is applied. When the tension is low, the membrane looks like a spring or helix with the coils having a very small pitch (coils close together) and a coil diameter between 2 and 50 times the outer diameter of the membrane. As the tension on the membrane increases, or the length of the membrane is increased, the pitch distance from one coil to the next also increases, and the coils move further apart with the diameter of the coil reduced. In the extreme, under sufficient tension, the membrane becomes linear. If the ends of the hollow fibre membranes are potted, then the tension on the coiled membranes will increase as the potted ends are moved further apart. If the membrane is both coiled and elastic it can also be stretched beyond its nominal length. For example, a 1 m long hollow fibre membrane may only be 0.5-0.75 m in length when coiled and in its natural curled or coiled state (no tension, its predisposed/native state). Yet, if the membrane is elastic, it may also be stretched beyond its nominal length to a length of, for example, 1.1 m-1.50 m. The membrane may also be stretched up to 4-times its nominal length without causing any damage to the elasticity of the membrane. The membrane will always return to its original length retaining its elasticity and returning to its natural curled or coiled state. Thus, the shape and effective length of the membrane can be modified by changing the distance between the upper and lower manifolds to which the potted ends of the hollow fibres are secured.

Figure 1:
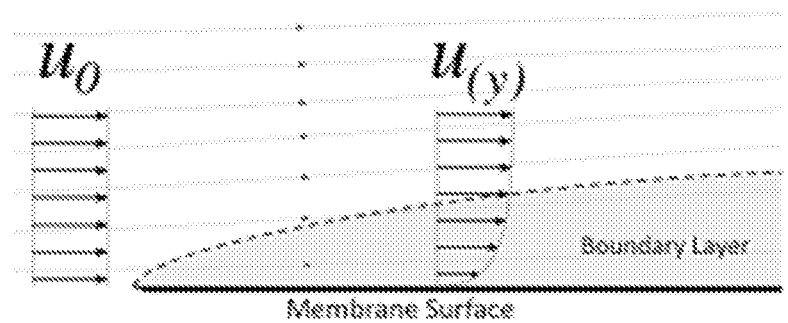
FIG. 1 illustrates the theory of how a liquid boundary layer develops over the surface of a membrane.
Figure 2:
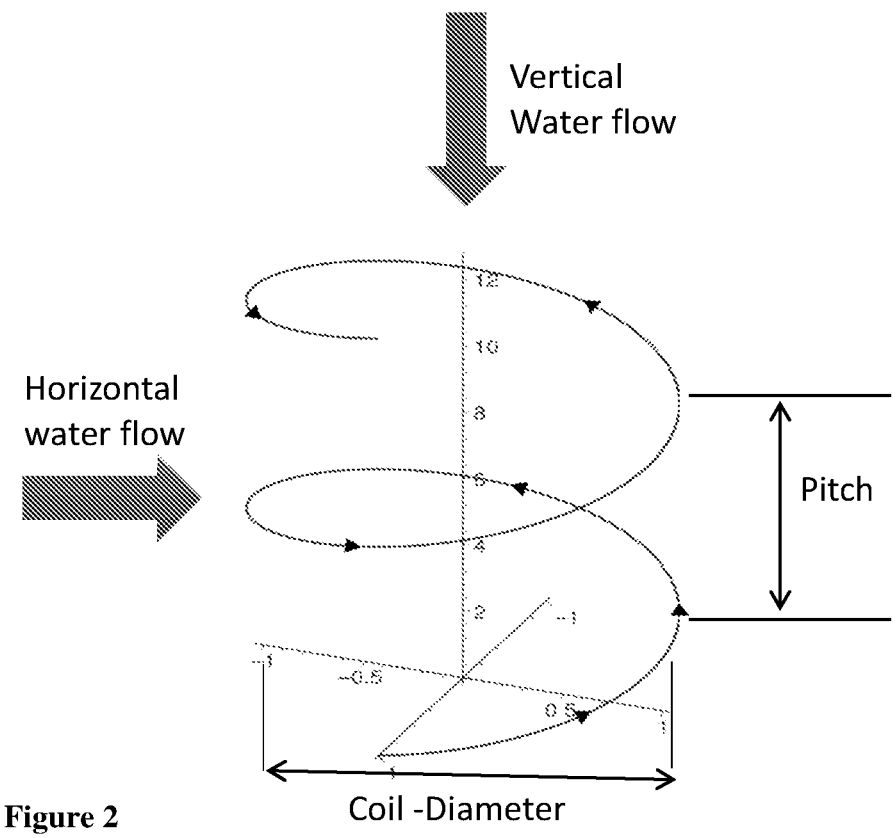
FIG. 2 illustrates a coil section of a coiled membrane. This drawing illustrates that the boundary layer thickness is minimised over the length of the membrane regardless of the direction of the water flow.
Figure 3:
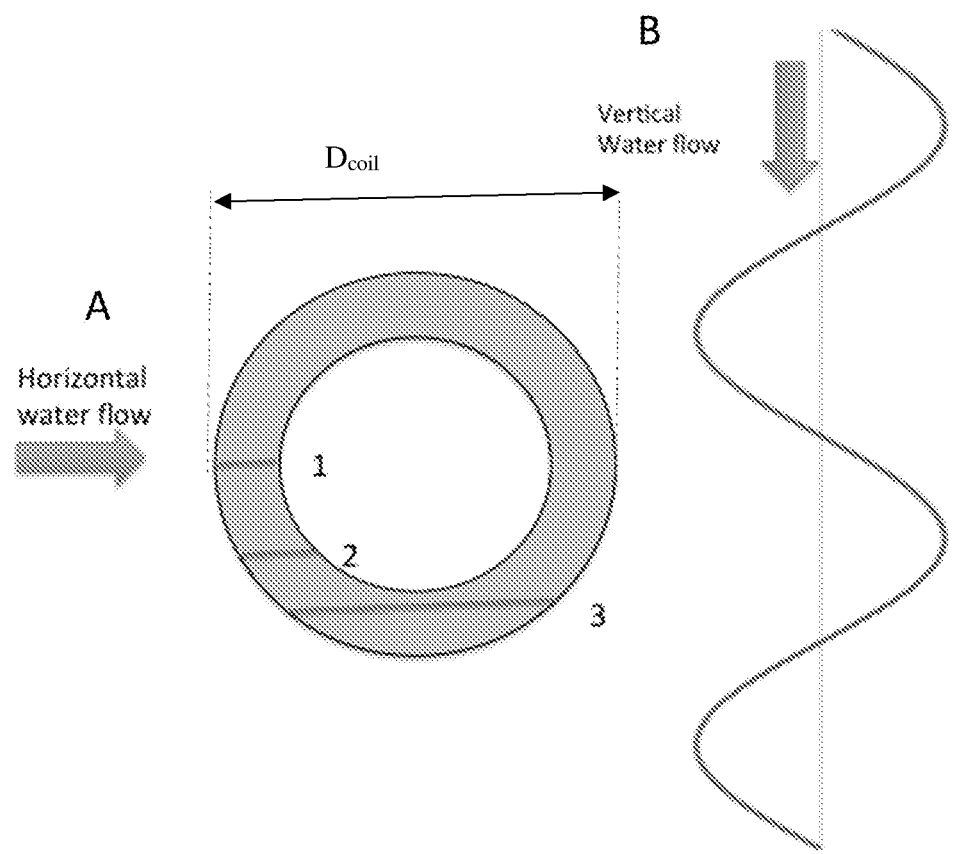
FIG. 3 Graphic illustration of the short contact distance between the water and the membrane. The figure (A) shows a plan view and the figure (B) shows a horizontal perspective of the coiled membrane.

The impact of the helical or coiled shape of the membranes on boundary layer development is best illustrated by viewing FIG. 2 and FIG. 3. In FIG. 2, a single coil of a helically-shaped hollow fibre membrane is shown and the arrows indicate examples of horizontal and vertical fluid flow over the membrane surface. Regardless of the direction of flow, the fluid is only in contact with a short length of the membrane surface and this does not allow a thick boundary layer to form. This effect is clarified in FIG. 3. FIG. 3A shows a plan view of a vertically aligned coiled membrane with a coil-diameter of $D_{coil}$ and FIG. 3B shows an elevation perspective of the coiled membrane. The helical shape takes on a circular aspect in a plan view and a horizontal fluid flow across the coiled membrane would have lengths of contact with the membrane as illustrated by the horizontal lines marked 1, 2 and 3 in FIG. 3A. Line 1 represents the shortest contact length, which is equal to the diameter of the membrane, and 3 represents the longest possible contact length and is approximately equal to the diameter of the coil. FIGS. 2 and 3B also show that if the fluid is flowing vertically through the coiled membrane then the fluid is traversing the diameter of the hollow fibre membrane at an angle that is pitch-dependent and the contact distance between the fluid and membrane is also short.

Figure 4:
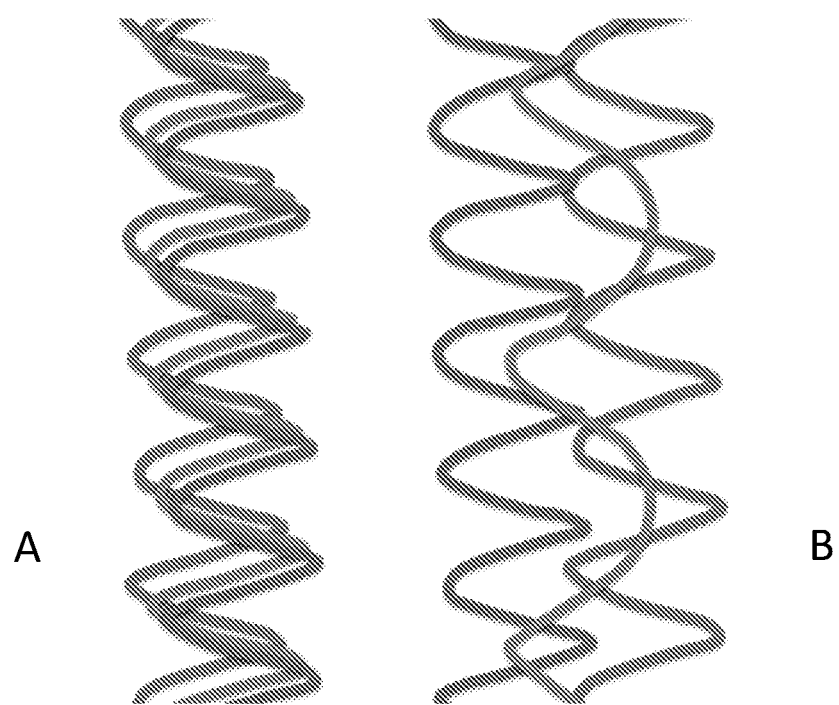
FIG. 4 illustrates the behaviour of coiled membranes in a bundle. (A) Fibres with exactly the same pitch and coil direction will tend to nest together, as shown, independent of the applied tension. (B) When the coils have different pitch and coil direction, they tend to naturally push each other apart and spread laterally as the tension is reduced.

When bundles of coiled hollow fibre membranes are potted into manifolds, it is important to ensure that the coiled fibres do not nest together as illustrated in FIG. 4A. When the fibres nest in this way, the fibres remain very close together and in contact with each other, regardless of the tension on the membranes. This nesting behaviour hinders mass transfer by reducing the effective surface area of the membranes and hindering the flow of fluid around and between the individual hollow fibres. This nesting behaviour can be avoided by potting self-coiling hollow fibre membranes, which have slightly different pitch, as well as by mixing fibres coiled in different directions (clockwise and counter-clockwise). FIG. 4B illustrates the desired bundle behaviour. When the fibres are potted in this manner, the individual hollow fibres tend to push each other apart and therefore spread laterally. The result is a much more open structure which exposes more membrane area for mass transfer. In addition, the more porous structure of the membrane bundle encourages better fluid flow into the bundle and between the hollow fibres.

The lateral width of the fibre bundle shown in FIG. 4B, that is, is subject to changes in length when stretched by increasing the distance between the upper and lower manifold. Under tension, the three fibres illustrated in FIGS. 4A and 4B will revert to a linear form having the same lateral width. However, as the tension is relaxed, that is when the distance between the upper and lower manifold is decreased, the fibres in FIG. 4B will spread much further apart laterally, while the fibres in FIG. 4A will have little to no tendency to move apart, only the pitch will change.

Typically, when large numbers of large bundles of fibres are used, as is common in commercial full-scale systems, it is difficult to achieve uniform fluid contact with all of the membranes in a reactor. For example, slack hollow-fibre membranes tend to be either pushed together (in cross-flow applications) or fluid delivery to the centre of vertical bundles in parallel flow is poor and the fluid preferentially flows around the fibre bundles instead of through them. These effects tend to reduce the overall mass transfer performance of the membranes. This situation is ameliorated by the use of coiled membranes as shown in FIG. 4B. The open structure of the membrane bundles together with their coiled structure leads to effective membrane-fluid contact and superior mass transfer.

Another aspect of this membrane is that this coiled nature is an inherent property of the membrane and is imparted to the membrane due to the method of manufacture whether that be by extrusion, spinning or casting. The undulating nature is not created in a separate post-fabrication step, such as by crimping, or winding or post-production heating of the membrane while held in a coiled state.

In one embodiment, the hollow membrane is manufactured by extrusion of the polymer, e.g. PDMS or silicone, through a die. The die has an opening of between 1.01- and 2-times the outer diameter of the final hollow fibre membrane. The fluid annulus which leaves the die has a larger diameter with a thicker wall than the desired final hollow fibre membrane. The fluid PDMS or silicone is forced through the die in an asymmetric flow and when it passes through the high temperature oven, the PDMS or silicone molecules crosslink and result in the solidification of the fluid PDMS or silicone. The fluid annulus leaving the die creating the asymmetric flow, the solidification of the PDMS or silicone fibre membrane and the speed of the conveyor receiving the solidified membrane creates a coiled/helical membrane when under no tension, that is, when in its natural, relaxed state.

The TIPS process involves heating of the polymer and spinning the hollow fibre through a die nozzle into a bath of cool liquid (usually water) to cool. The polymer sets and hardens when cooled. The die nozzle has an opening of between 1.01- and 2-times the outer diameter of the final hollow fibre membrane. The fluid annulus which leaves the die has a larger diameter with a thicker wall than that of the desired final hollow fibre membrane, and can also have a thicker wall on one side, creating an asymmetric flow. As the fluid is spun through the die having this arrangement, the membrane is predisposed to adopt a coiled configuration when it cools.

The SIPS process involves dissolving the polymer in a solvent and which is then cast from a die nozzle into a bath of water. The die nozzle has an opening of between 1.1 and 2 times the outer diameter of the final hollow fibre membrane. In this instance, the fluid annulus which leaves the die has a larger diameter with a thicker wall than that of the desired final hollow fibre membrane, and a thicker wall on one side, creating an asymmetric flow. The solvent is removed from the solvent/polymer solution in the water as the solvent is miscible in water but the polymer is immiscible, the polymer then crystalizes, and the resulting hollow fibre membrane adopts a coiled/helical configuration without applying any tension. In other words, the membrane is predisposed to adopt a coiled/helical configuration.

In each of the methods of manufacture of the membrane, the feature of a flexible coil/helix-like structure is created by a combination of the opening of the die being between 1.01- and 2-times the outer diameter of the final hollow fibre membrane, the speed and asymmetric nature of the flow of the membrane material leaving the die and the solidification of the polymeric material through thermosetting, cooling or crystallization. For the extrusion process, the speed of the conveyor accepting the extruded solidified polymeric material runs faster than the extrusion speed; which contributes to the membrane adopting a coiled/helical configuration.

Figure 5:
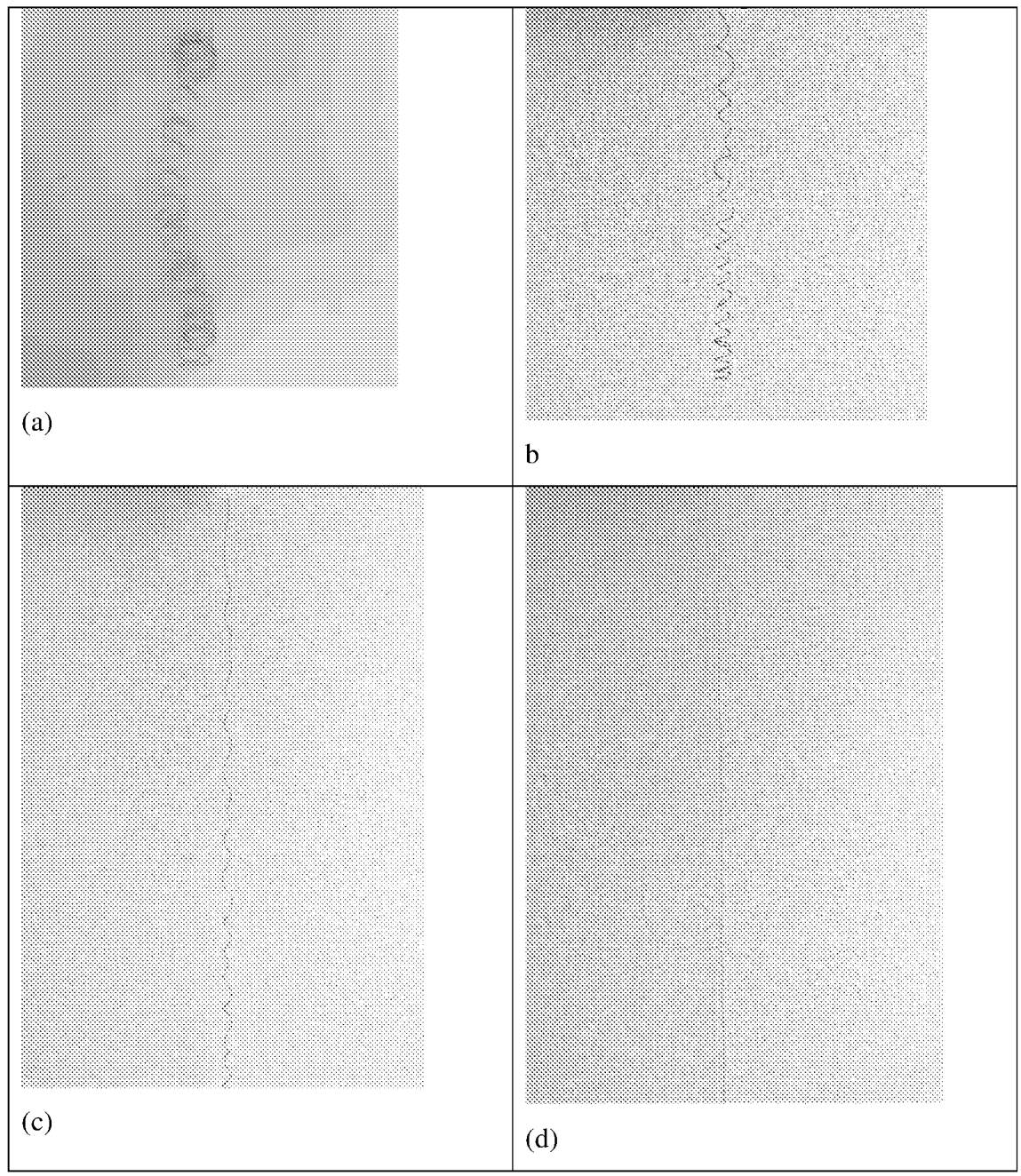
FIG. 5: Shows a photograph of a single hollow fibre membrane which is under 4 different tensions. (a) The new helix shaped hollow fibre membrane when it is under no tension; (b) the new helix shaped hollow fibre membrane when it is hung under its own weight; (c) the new helix shaped hollow fibre membrane under tension and (d) the new helix shape hollow fibre membrane when it is under enough tension to be pulled straight.

In FIG. 5(a), a helical (coiled) hollow fibre membrane is under no tension and is in its natural state. In FIG. 5(b) the hollow fibre is suspended and the upper part of the helix is elongated under the tension caused by the weight of the mass of the lower membrane (or the perceived vertical movement of the lower manifold in a direction opposite to that of the upper manifold). In FIG. 5(c) an additional tension is being placed on the fibre by extending both ends of the fibre (where the vertical movement of the upper and lower manifolds move away from each other). In FIG. 5(d) the fibre is placed under enough tension that its helical structure has been lost and the hollow fibre has become straight. These effects are reversible so that when the tension is relaxed (that is, when distance between the lower and upper manifolds decreases), the fibre reverts back to the form shown in 5(a).

FIG. 6A shows a bundle of coiled hollow fibre membranes simply hanging under its own weight, while FIG. 6B shows the same membrane module under tension. This figure illustrates how the membranes spread out laterally as the tension is relaxed on the fibres. The relaxed fibre bundle (FIG. 6A) has a more open structure, which makes it easier for water to flow into and through the hollow fibres in the bundle. FIG. 6 also illustrates the change in the bundle shape as the distance between the upper and lower ends of the bundle changes. The distance between the upper and lower ends of the membrane bundle shown in FIG. 6B is 15% greater than that shown in FIG. 6A.

Figure 7:
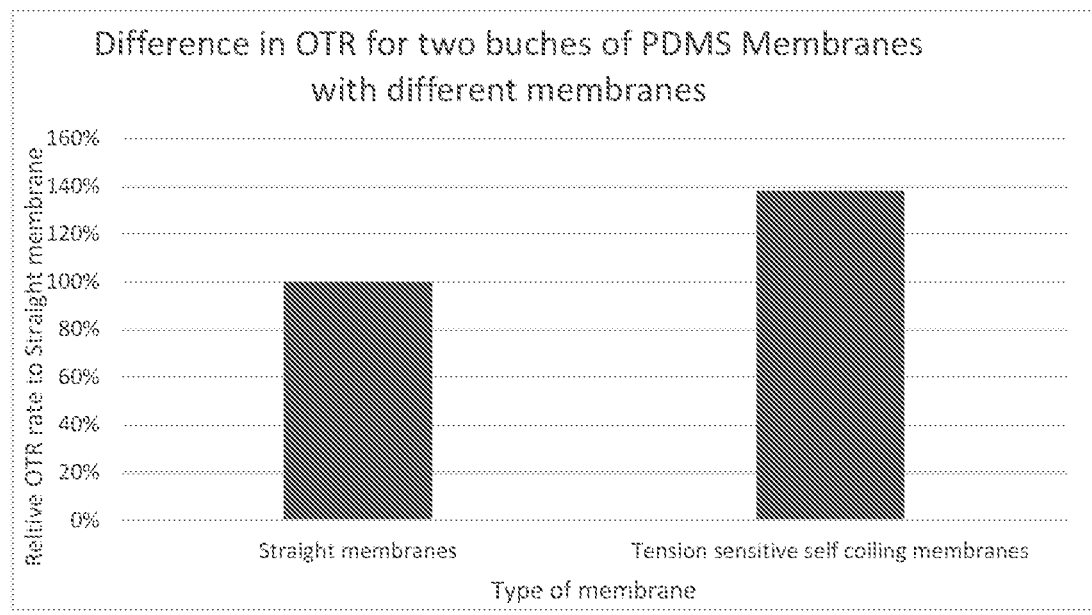
FIG. 7 is a graph representing the experimentally measured Oxygen Transfer Rate of an array of 550 naturally coiled hollow fibre PDMS membranes with an array of 550 straight hollow fibre PDMS membranes.

FIG. 7 demonstrates the improvement in the oxygen transfer rate that can be achieved with the use of tension-sensitive self-coiling membranes under conditions in which the mass transfer is limited by diffusion through the liquid boundary layer surrounding the membranes. Measurements were taken by placing an array of membranes in a vertical tank of clean water, which was mixed by means of a recirculation pump and all of the dissolved oxygen was initially removed by the addition of excess sodium sulphite. A dissolved oxygen probe was then used to monitor the increase in dissolved oxygen concentration in the water as air was supplied to the lumen of the hollow-fibre membrane. The specific rate of oxygen transfer was then calculated based on the external surface area of the membranes and the results shown are normalized relative to straight, non-tension sensitive hollow fibre membranes.

Figure 8:
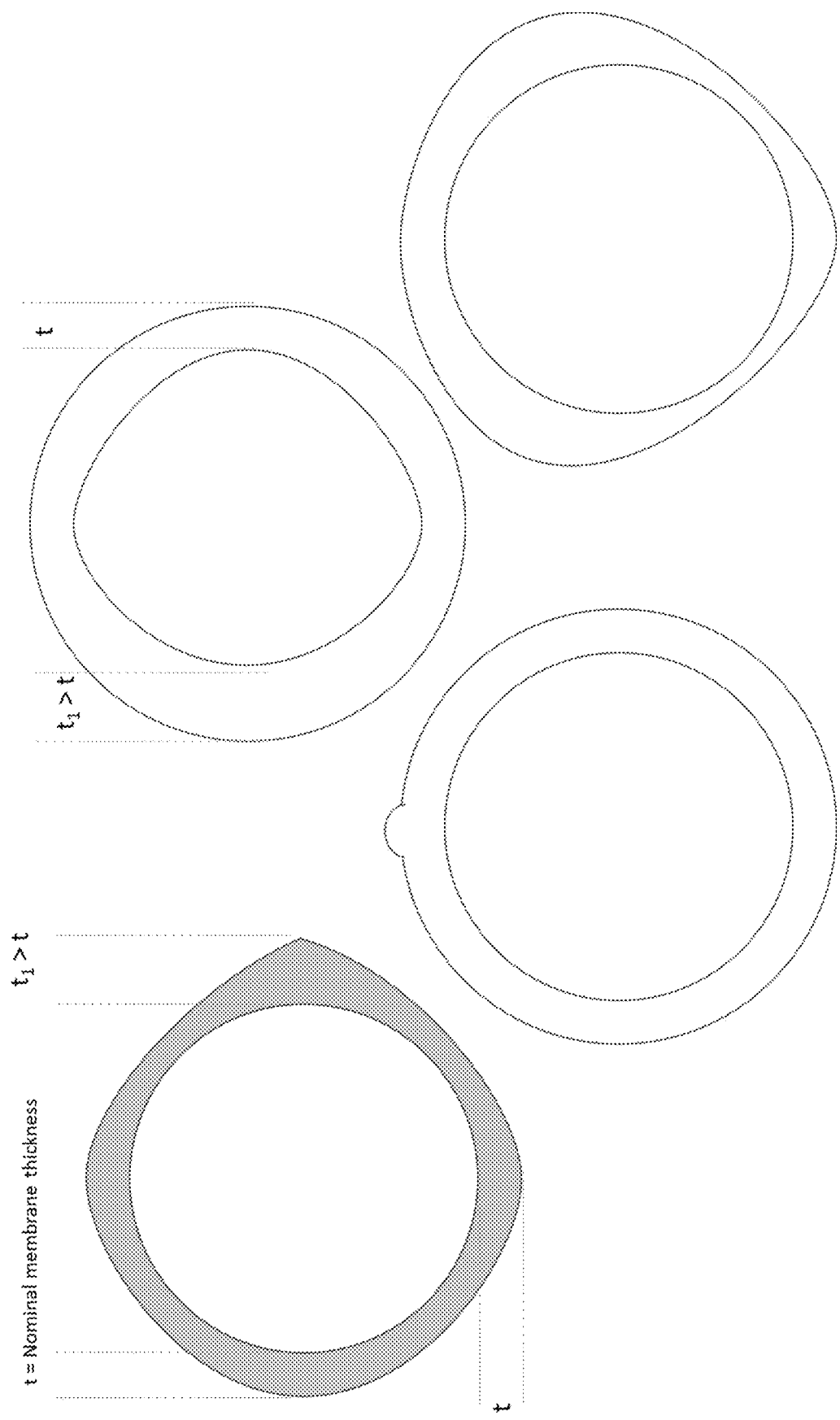
FIG. 8 illustrates an example of cross-sectional profiles of membranes with result from asymmetrical flow through a die nozzle. t=nominal membrane thickness, and $t_1 > t$ where the thickness is greater than the nominal thickness.

FIG. 8 illustrates examples of cross-sectional profiles of hollow fibre membranes of the invention which result from the asymmetrical flow of plastic polymer from the nozzle/die during the manufacturing process. The hollow fibre membrane has a nominal outer wall thickness, t, and also a thickness, $t_1$, which is greater than the thickness, t. In some instances, ridges or indentations may form on the outer circumference of the membrane wall. This difference in the outer membrane wall thicknesses around the circumference of the fibre membrane lumen provides the stresses that cause the membranes to adopt a curly, coiled, helical, hemihelical or undulated native form without the need for post-processing interference.

Figure 9:
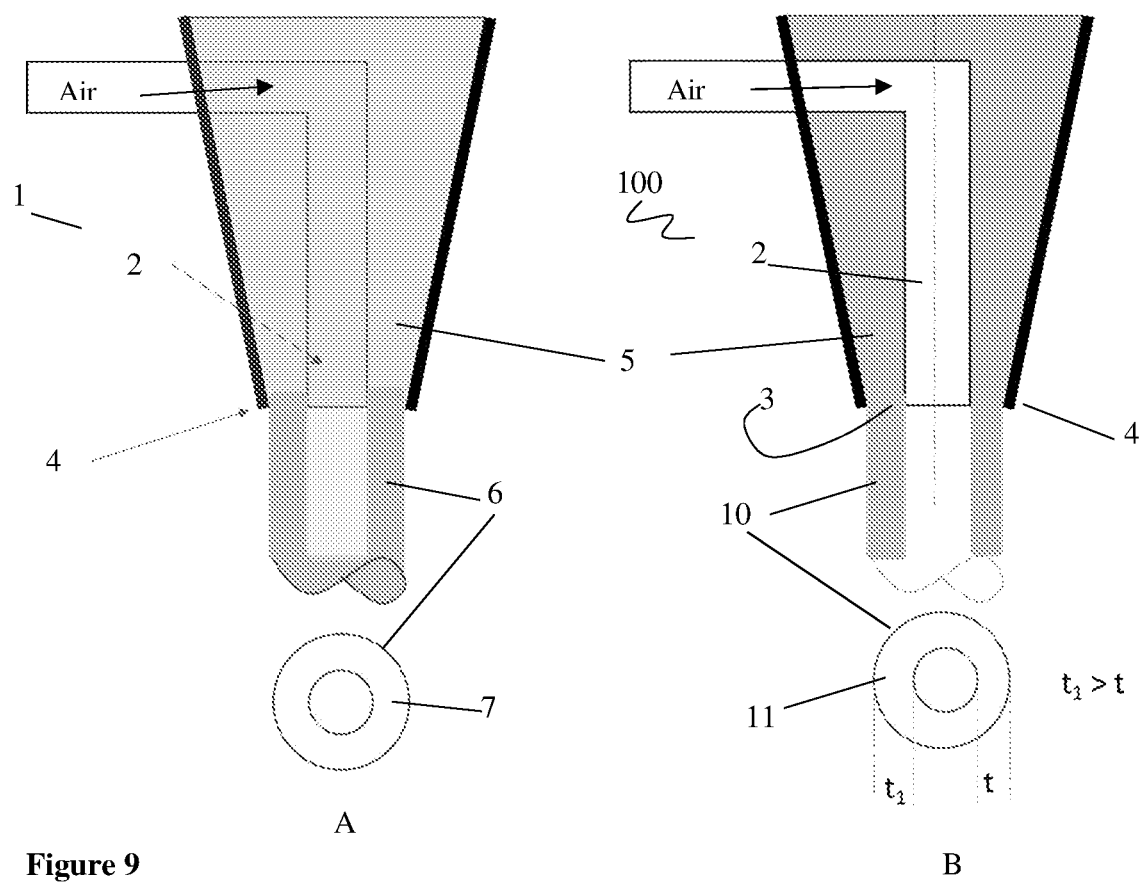
FIG. 9 illustrates the die nozzle arrangement for symmetrical flow (linear) and asymmetrical flow (non-linear) for use in the extrusion process of manufacturing hollow fibre membranes.

FIG. 9 illustrates the nozzle/die and needle arrangement which produces both the linear membranes of the prior art and the non-linear membranes described herein. The arrangement 1 in (A) shows a needle 2 situated in the centre of an opening 3 of a nozzle/die 4. The central arrangement of the needle 2 produces a symmetrical flow of liquid polymer 5 through the opening 3, which creates a hollow fibre membrane 6 with an outer wall 7 having a symmetrical thickness.

In (B), there is illustrated an arrangement 100 in which steps or parts described with reference to (A) above are assigned the same numerals. In the arrangement 100, the needle 2 is aligned off-centre of the opening 3 of the nozzle/die 4. The off-central arrangement of the needle 2 produces an asymmetrical flow of liquid polymer 5 through the opening 3, which creates a hollow fibre membrane 10 with an outer wall 11 having an asymmetrical thickness ($t_1 > t$).

Figure 10:
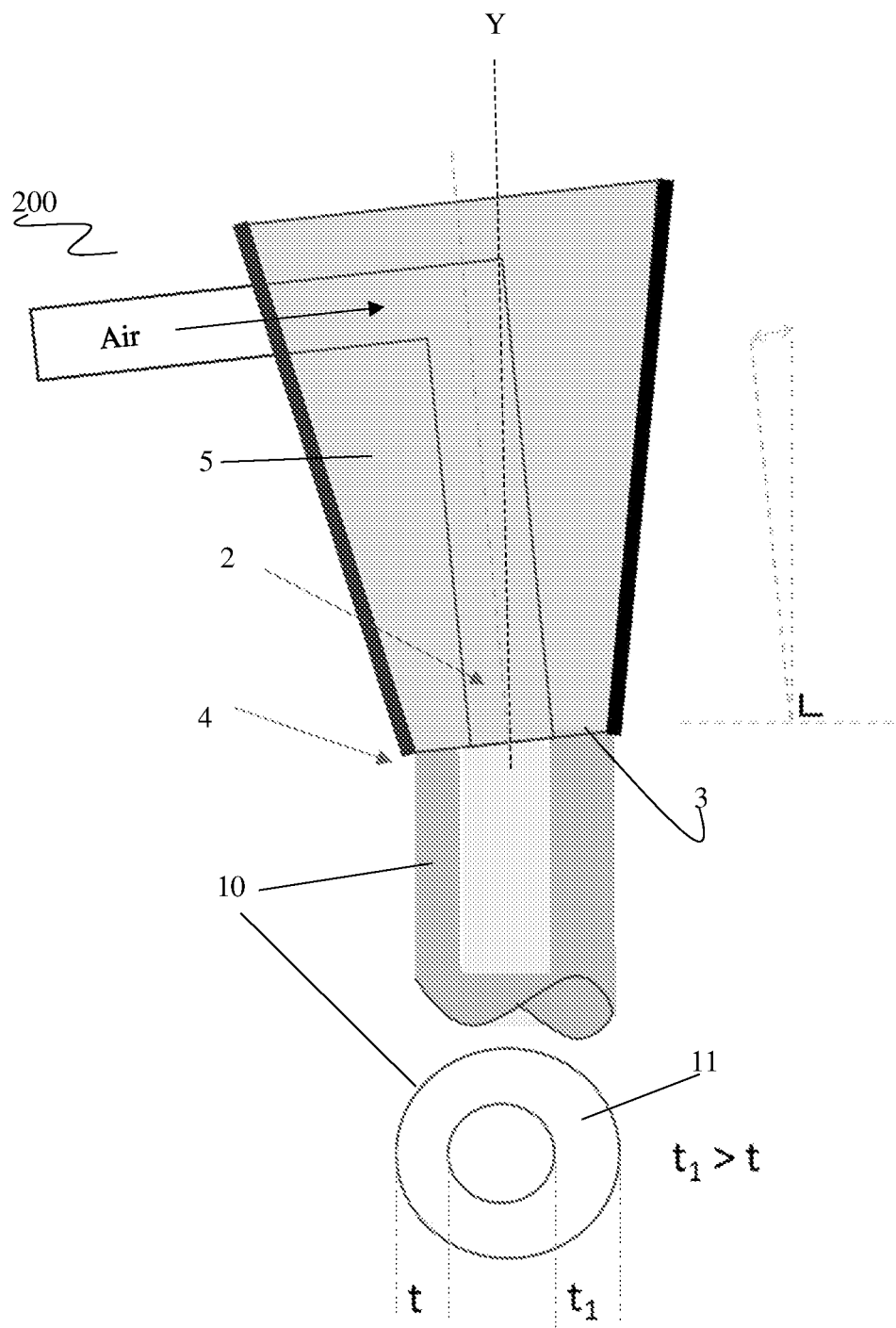
FIG. 10 illustrates how an asymmetrical flow is generated in a TIPS, SIPS or spinning process utilising a symmetrical die nozzle arrangement.

FIG. 10 there is illustrated an arrangement 200 in which steps or parts described with reference to (A) and (B) above in FIG. 9 are assigned the same numerals. In the arrangement 200, the angle of the nozzle/die 4 is tilted when used during the TIPS, SIPS or spinning processes. The nozzle/die 4 is titled at an angle of between 2° to 30° from the vertical axis Y with an optimal range of between 5° and 15°. The tilt of the nozzle/die 4 creates an asymmetrical flow during the TIPS, SIPS or spinning process, which creates the hollow fibre membrane 10 with an outer wall 11 having an asymmetrical thickness.

Membrane Applications:

Liquid Filtration

During filtration, the particulates, colloids, large molecular weight compounds and microorganisms, which are retained by the membrane, tend to concentrate in the boundary layer at the external membrane surface. Commercial membrane filtration systems are designed to ensure that the water surrounding the membranes is well mixed, and that the mixing conditions, which create good fluid flow past the surface of the membranes, encourage removal of the retained contaminants from the surface of the membrane. Aeration is also used to both encourage membrane movement and to create localized turbulence, which can help disrupt the boundary layer and minimize concentration polarization. When poor mixing conditions and low shear conditions prevail, contaminants, particles and microorganisms rapidly attach to the membrane surface, which causes the external surface of the membranes to become coated in a chemical/biological layer that impedes filtration. This process is referred to as membrane fouling. Fouling is an expensive problem since it reduces the filtration performance of the membrane. Reversible fouling is removed from the surface of the membrane by periodically backwashing the membrane with permeate. This fouling layer on the surface of the membrane is then removed. Irreversible fouling can also occur and contributes to reduced membrane life. Irreversible fouled membranes must be taken out of service and chemically cleaned to remove the foulant layer. Good mixing conditions can substantially reduce fouling.

Gas Diffusion

In membrane modules for gas diffusion, the boundary liquid layer typically becomes the rate limiting step for mass transfer or flux between the membrane lumen and the bulk liquid. The boundary layer effectively increases the distance through which gas molecules must diffuse to permeate from the gas phase inside the membrane to the dissolved phase in the bulk liquid. The boundary layer therefore represents a resistance to mass transfer and the thickness of the boundary layer affects the overall mass transfer coefficient. The thicker the boundary layer, the lower the mass transfer and the slower the rate of mass transfer. Many attempts have been made to develop methods of breaking up these liquid boundary layers including introducing spacers to promote static mixing (Pentair X-Flow helix, Liqui-Cel® placing baffles inside membrane modules), changing or reversing flow direction, or the introduction of bubbles or other turbulences into the liquid around the membrane. Most of these developments rely on either an addition to the membrane module or a periodic change to the operating conditions to break up the boundary layer.

The advantage of using the tension-sensitive membranes which can take on a helical, spring-like configuration, as described herein, is that they achieve high mass transfer rates by minimizing boundary layer development and creating a liquid penetrable 3D structure which provides a torsional and dynamic flow path. They do this when used as self-expanding fibre bundles and which take on a configuration that encourages frequent boundary layer disruption and a correspondingly thin boundary layer. The fibre bundles using the membranes described herein will provide superior mass transfer performance to existing membrane module designs. In addition, the actual shape and behaviour of the bundles will be tension sensitive so that the mass transfer performance of the system can be manipulated to minimize the energy requirements for air and fluid flows for fouling control and gas transfer.

REFERENCES

X. Yang, R. Wang, A. G. Fane; Novel designs for improving the performance of hollow fibre membrane distillation modules. J. Membr. Sci. 248, (2011) 52-62.

X. Yang, E. O. Fridjonsson, M. L. Johns, R. Wang, A. G. Fane, A non-invasive study of flow dynamics in membrane distillation hollow fiber modules using low-field nuclear magnetic resonance imaging (MRI), J. Membr. Sci. 451 (2014) 46-54.

Luelf, Tobias & Bremer, Christian & Wessling, Matthias. (2016). Rope coiling spinning of curled and meandering hollow-fiber membranes. Journal of Membrane Science. 506. 10.1016/j.memsci.2016.01.037.

P. Moulin, J. Rouch, C. Serra, M. Clifton, P. Aptel; Mass transfer improvement by secondary flows: Dean vortices in coiled tubular membranes. J. Membr. Sci., 114 (1996), pp. 235-244

The invention claimed is:

1. A poly-dimethyl-siloxane hollow fibre membrane having a hemihelix, a helical or an undulated native form wherein when placed under tension, the hollow fibre membrane has its pitch altered and in which the membrane can be stretched by up to 4-times its original length so that the poly-dimethyl-siloxane hollow fibre membrane goes from a non-linear form to a substantially linear form with no plastic deformation; wherein the native form of the poly-dimethyl-siloxane hollow fibre membrane is produced by the asymmetric flow of liquid polymer through a die opening and around a needle which are asymmetrically aligned; wherein the direction of the hemihelical form, coiled form or undulated form of the poly-dimethyl-siloxane membrane fibre is in a clockwise direction or an anticlockwise direction, or a combination thereof; and wherein when the membrane has a helical form, the membrane fibre has a fixed length with a variable distance in pitch, or has a regular coil diameter length and a regular coil pitch length, and wherein the hollow fibre membrane comprises pores of less than 5 µm.

2. The poly-dimethyl-siloxane hollow fibre membrane according to claim 1, wherein the membrane is produced by an extrusion process or a spinning process in air.

3. The poly-dimethyl-siloxane hollow fibre membrane of claim 1, wherein the hollow fibre membrane is gas permeable.

4. The poly-dimethyl-siloxane hollow fibre membrane of claim 1, wherein the hollow fibre membrane is a dense membrane and substantially free of pores.

5. The poly-dimethyl-siloxane hollow fibre membrane of claim 1, wherein an internal diameter of the hollow fibre membrane is between 50 µm and 10 mm.

6. The poly-dimethyl-siloxane hollow fibre membrane of claim 1, wherein the hollow fibre membrane has a cylindrical inner and outer cross section or a cylindrical inner and non-cylindrical outer cross section.

7. The poly-dimethyl-siloxane hollow fibre membrane of claim 1, wherein the membrane is a silicone membrane and has an outer surface that is uneven or irregular comprising projections or ridges extending outward from the outer surface of the membrane, and wherein the native form of the membrane is produced by the asymmetric flow of liquid polymer through an opening of a die or nozzle.

8. The poly-dimethyl-siloxane hollow fibre membrane of claim 1, wherein the hollow fibre membrane has a cylindrical inner and outer cross section or a cylindrical inner and non-cylindrical outer cross section; wherein when the hollow fibre membrane has a cylindrical inner and non-cylindrical outer cross section, the hollow fibre membrane has an outer surface that is uneven or irregular, including projections or ridges extending outward from the outer surface of the membrane or with indentations extending inwards.

9. A method of manufacturing a poly-dimethyl-siloxane hollow fibre membrane having a hemihelix, a helical or an undulated native form, wherein when placed under tension, the hollow fibre membrane has its pitch altered and in which the membrane can be stretched by up to 4-times its original length so that the poly-dimethyl-siloxane hollow fibre membrane goes from a non-linear form to a substantially linear form with no plastic deformation, and wherein the native form of the membrane is produced by the asymmetric flow of liquid poly-dimethyl-siloxane polymer through an opening of a die or nozzle, the method comprising the steps of:

passing the liquid poly-dimethyl-siloxane polymer through a die opening and around a needle which are asymmetrically aligned, wherein the opening produces an asymmetric flow of liquid polymer as it exits the die or the nozzle in air to produce a hemihelical, helical or undulated membrane.

10. The method according to claim 9, in which the poly-dimethyl-siloxane hollow fibre membrane is made by a process of extrusion, spinning, or casting in air.

11. The method according to claim 9, wherein the poly-dimethyl-siloxane hollow fibre membrane is made by a process of extrusion, spinning, or casting in air, and, wherein when the process is extrusion, an additional stress is imparted by extruding the poly-dimethyl-siloxane hollow fibre membrane onto a conveyor running at a higher speed than the fluid poly-dimethyl-siloxane polymeric membrane exiting the die or the nozzle.

12. The method according to claim 9, wherein the poly-dimethyl-siloxane hollow fibre membrane is made by a process of extrusion, spinning, or casting in air, and wherein the angle of the die or nozzle is tilted at least about 2° to 30° from the vertical axis Y of the poly-dimethyl-siloxane hollow fibre membrane.

13. The method according to claim 9, wherein the opening of the die or nozzle has a diameter at least 1.01- to 2-times that of the outer diameter of the poly-dimethyl-siloxane hollow fibre membrane.

\* \* \* \* \*